(12) United States Patent
Izawa et al.

(10) Patent No.: US 11,189,441 B2
(45) Date of Patent: Nov. 30, 2021

(54) KEY SWITCH DEVICE

(71) Applicant: OMRON Corporation, Kyoto (JP)

(72) Inventors: Kazuhira Izawa, Okayama (JP); Mamiko Naka, Okayama (JP); Kenshi Nagata, Tottori (JP); Hiroaki Fujino, Okayama (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/306,055

(22) PCT Filed: Apr. 13, 2017

(86) PCT No.: PCT/JP2017/015175
§ 371 (c)(1),
(2) Date: Nov. 30, 2018

(87) PCT Pub. No.: WO2017/208644
PCT Pub. Date: Dec. 7, 2017

(65) Prior Publication Data
US 2019/0214200 A1 Jul. 11, 2019

(30) Foreign Application Priority Data

Jun. 2, 2016 (JP) .............................. JP2016-111340
Mar. 15, 2017 (JP) .............................. JP2017-050212

(51) Int. Cl.
*H01H 3/12* (2006.01)
*H01H 13/14* (2006.01)
(Continued)

(52) U.S. Cl.
CPC .............. *H01H 13/14* (2013.01); *G06F 3/02* (2013.01); *H01H 3/125* (2013.01); *H01H 13/52* (2013.01);
(Continued)

(58) Field of Classification Search
CPC ....................................................... H01H 3/125
See application file for complete search history.

(56) References Cited

U.S. PATENT DOCUMENTS

| | | | |
|---|---|---|---|
| 5,947,616 A | 9/1999 | Liang | |
| 6,723,935 B1 * | 4/2004 | Watanabe | .............. H01H 3/125 |
| | | | 200/344 |

(Continued)

FOREIGN PATENT DOCUMENTS

| | | |
|---|---|---|
| CN | 2800464 Y | 7/2006 |
| CN | 103594270 A | 2/2014 |

(Continued)

OTHER PUBLICATIONS

International Search Report issued in PCT/JP2017/015174, dated Jun. 27, 2017 (2 pages).

(Continued)

*Primary Examiner* — Felix O Figueroa
(74) *Attorney, Agent, or Firm* — Osha Bergman Watanabe & Burton LLP

(57) ABSTRACT

A key switch device includes a base, a button mounted on the base so as to be contactable and separable, an elastic body disposed between the base and the button and configured to urge the button in a direction away from the base, and a linear reinforcement member provided on the button and configured to prevent the button from being inclined when the button is operated in a direction toward the base. An outer surface portion of the button includes a recessed support portion in which a part of the linear reinforcement members is disposed.

8 Claims, 11 Drawing Sheets

(51) Int. Cl.
  *G06F 3/02* (2006.01)
  *H01H 13/52* (2006.01)
  *H01H 13/702* (2006.01)
(52) U.S. Cl.
  CPC ..... *H01H 13/702* (2013.01); *H01H 2013/525* (2013.01); *H01H 2221/058* (2013.01); *H01H 2233/07* (2013.01); *H01H 2235/01* (2013.01)

(56) References Cited

U.S. PATENT DOCUMENTS

| | | | |
|---|---|---|---|
| 6,730,868 B1 * | 5/2004 | Watanabe | H01H 3/125 200/344 |
| 7,094,984 B2 * | 8/2006 | Yokoyama | B41J 5/12 200/344 |
| 8,299,382 B2 | 10/2012 | Takemae et al. | |
| 8,759,705 B2 | 6/2014 | Funakoshi et al. | |
| 10,236,138 B2 | 3/2019 | Chen et al. | |
| 10,714,282 B2 | 7/2020 | Izawa et al. | |
| 11,004,628 B2 | 5/2021 | Izawa et al. | |
| 2008/0006516 A1 | 1/2008 | Nishino et al. | |
| 2012/0118715 A1 | 5/2012 | Lin | |
| 2018/0323019 A1 | 11/2018 | Wu | |

FOREIGN PATENT DOCUMENTS

| | | |
|---|---|---|
| CN | 204497106 U | 7/2015 |
| CN | 105261507 A | 1/2016 |
| CN | 205016436 U | 2/2016 |
| CN | 105448566 A | 3/2016 |
| CN | 205645574 U | 10/2016 |
| JP | S61-145432 U | 9/1986 |
| JP | 2001-125705 A | 5/2001 |
| JP | 2004-127908 A | 4/2004 |
| JP | 2005-353478 A | 12/2005 |
| JP | 2011-049110 A | 3/2011 |
| JP | 2012-022473 A | 2/2012 |
| JP | 4869316 B2 | 2/2012 |

OTHER PUBLICATIONS

Written Opinion issued in PCT/JP2017/015174, dated Jun. 27, 2017 (5 pages).
International Search Report issued in PCT/JP2017/015175, dated Jun. 27, 2017 (1 page).
Written Opinion issued in PCT/JP2017/015175, dated Jun. 27, 2017 (4 pages).
Office Action issued in Chinese Application No. 201780033471.4, dated May 28, 2019 (13 pages).
Office Action issued in corresponding Chinese Application No. 201780033760.4, dated May 31, 2019 (14 pages).
Office Action issued in Japanese Application No. 2017-050212; dated Jan. 7, 2020 (7 pages).
Office Action issued in Japanese Application No. 2017-049830; dated Jan. 7, 2020 (9 pages).
Office Action issued in Chinese Application No. 201780033471; dated Jan. 15, 2020 (13 pages).
Office Action issued in U.S. Appl. No. 16/305,677; dated Sep. 4, 2020 (15 pages).
Office Action issued in related U.S. Appl. No. 16/305,677, dated Jun. 21, 2021 (11 pages).
Office Action issued in U.S. Appl. No. 16/305,677, dated Feb. 10, 2021 (12 pages).

* cited by examiner

KEY SWITCH DEVICE

TECHNICAL FIELD

The present invention relates to a key switch device mainly used for a keyboard.

BACKGROUND ART

As a key switch device, there is hitherto known a device obtained by covering, with a key cap, a button that is elastically supported so as to be pressable to the base (e.g., see Patent Document 1).

When the key switch device with the above configuration is to be adopted in a key having an elongated shape, such as a space key on a keyboard, a linear reinforcement member is typically disposed between the key cap and the base so that the key is not inclined even when its end is pressed. The linear reinforcement member is connected to a support portion by snap-fit and rotatably held, the support portion having an arcuate shape in cross section and being formed on the lower surface of the key cap.

Meanwhile, when the linear reinforcement member is connected to the support portion by snap-fit, the following problems may occur.

The support portion cannot be recovered in shape and remains deformed, and the linear reinforcement member tends to fall off.

The elastic force of the support portion is so strong that the linear reinforcement member comes into a non-rotatable or hardly rotatable state.

That is, it is not possible to bring the linear reinforcement member into a favorably mounted state, which might cause an operation failure of the space key.

Further, since the support portion is formed on the rear side as viewed from the mounting direction of the key cap, the support portion cannot be visually observed, which complicates the work of connecting the linear reinforcement member to the key cap.

PRIOR ART DOCUMENT

Patent Document

Patent Document 1: Chinese Utility Model Registration No. 205645574

SUMMARY OF THE INVENTION

Problems to be Solved by the Invention

It is an object of the present invention to provide a key switch device capable of easily obtaining a favorable mounting state of a linear reinforcement member.

Means for Solving the Problem

As a means for solving the above problem, the present invention provides a key switch device including: a base; a button mounted on the base so as to be contactable and separable; an elastic body disposed between the base and the button and configured to urge the button in a direction away from the base; and a linear reinforcement member provided on the button and configured to prevent the button from being inclined when the button is operated in a direction toward the base. An outer surface portion of the button includes a recessed support portion in which a part of the linear reinforcement members is disposed to support the linear reinforcement member.

Effect of the Invention

According to the present invention, the linear reinforcement member can be supported on the button in advance, and a favorable mounting state can be obtained. Further, the support portion has a recessed shape, so that it is possible to facilitate mounting of the linear reinforcement member thereon in a visible state.

MODE FOR CARRYING OUT THE INVENTION

Hereinafter, an embodiment of the present invention will be described with reference to the accompanying drawings. In the following description, terms indicating specific directions or positions (e.g., terms including "upper", "lower", "side", and "end") are used as necessary, but the use of these terms is for facilitating understanding of the invention with reference to the drawings, and the technical scope of the present invention is not limited by the meaning of these terms. The following description is merely exemplary in nature and not intended to limit the present invention, its application, or its usage. Further, the drawings are schematic, and ratios of dimensions do not necessarily agree with actual ones.

Figure 1:
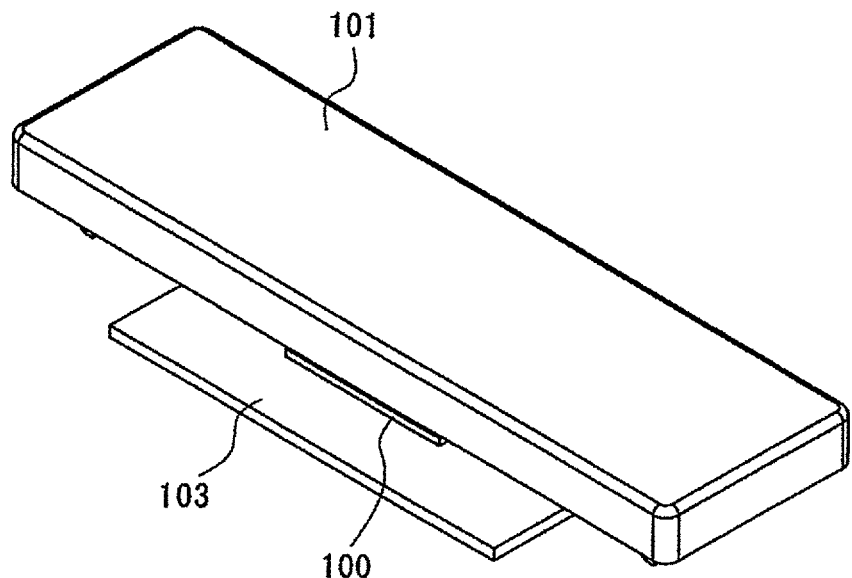
FIG. 1 is a perspective view illustrating a state in which a key switch device according to the embodiment is placed on a printed circuit board and a key cap is mounted thereto.
Figure 2:
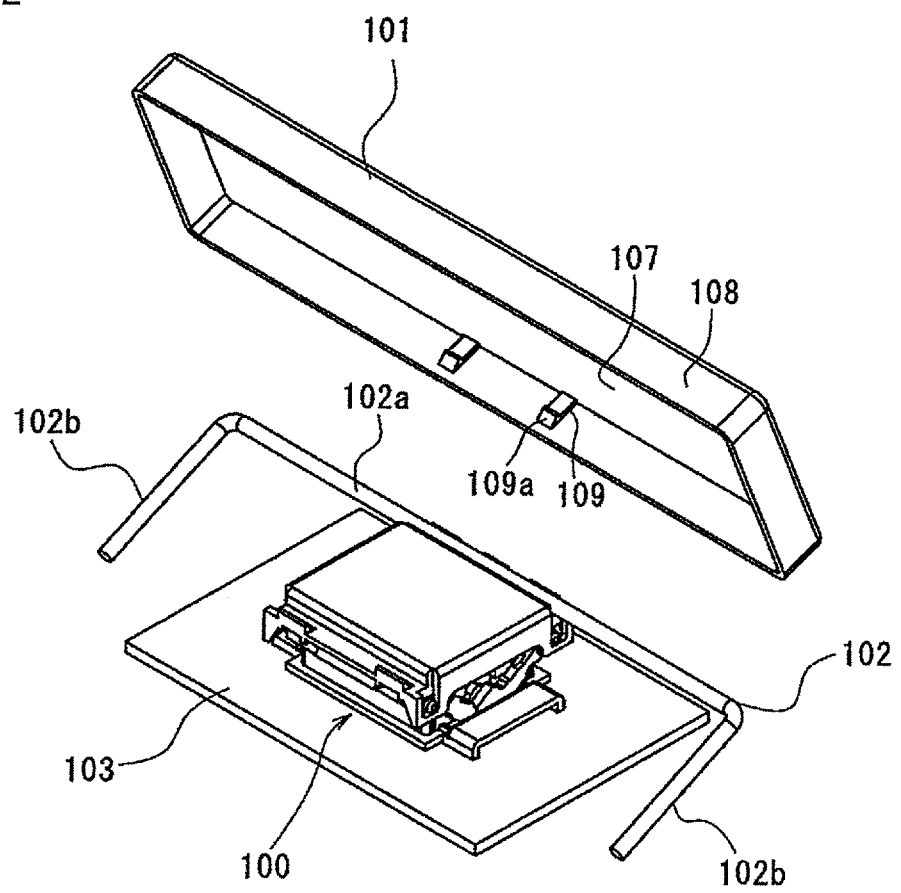
FIG. 2 is a perspective view illustrating a state in which the key cap has been removed from FIG. 1.
Figure 3:
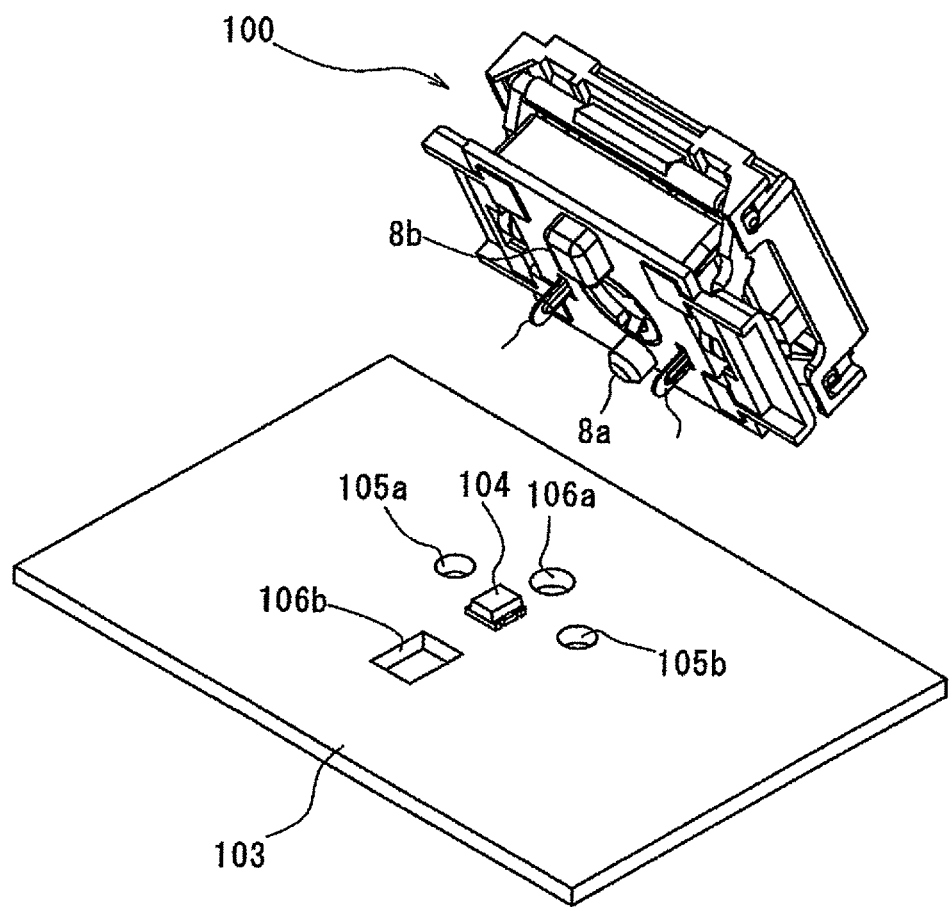
FIG. 3 is a perspective view illustrating a state in which the key switch device has been removed from FIG. 2.
Figure 4:
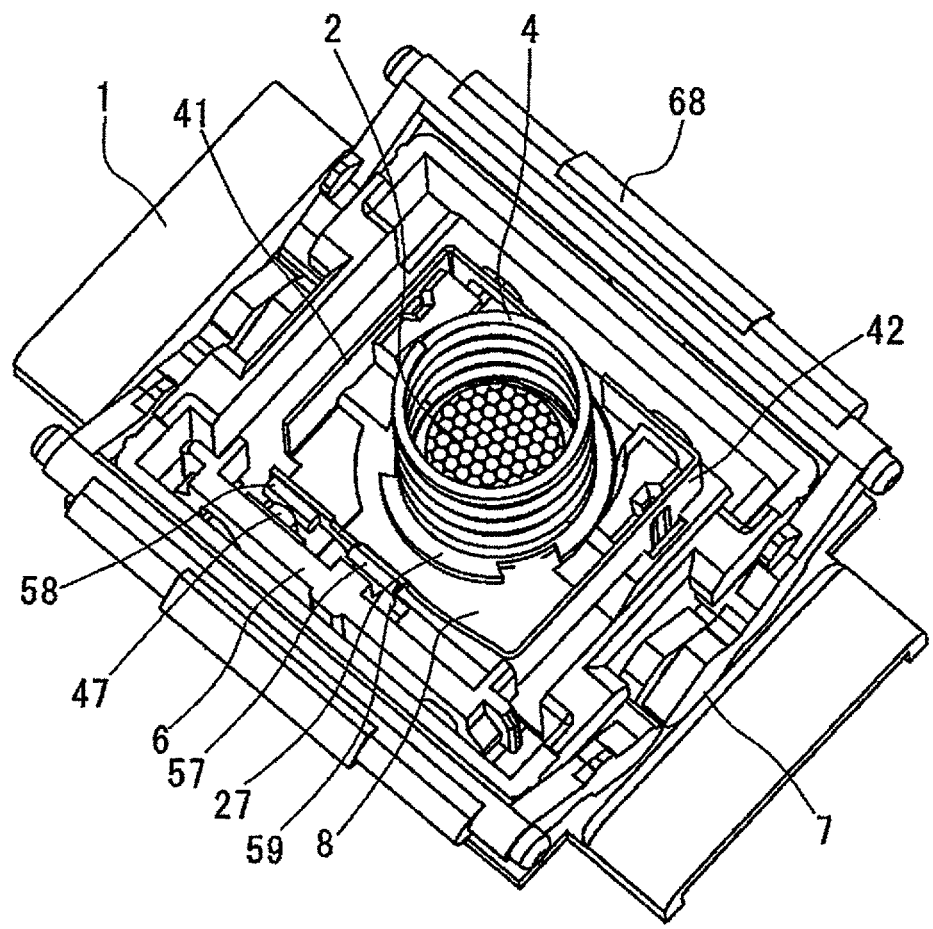
FIG. 4 is a perspective view illustrating a state in which a button has been removed from the key switch device illustrated in FIG. 2.
Figure 5:
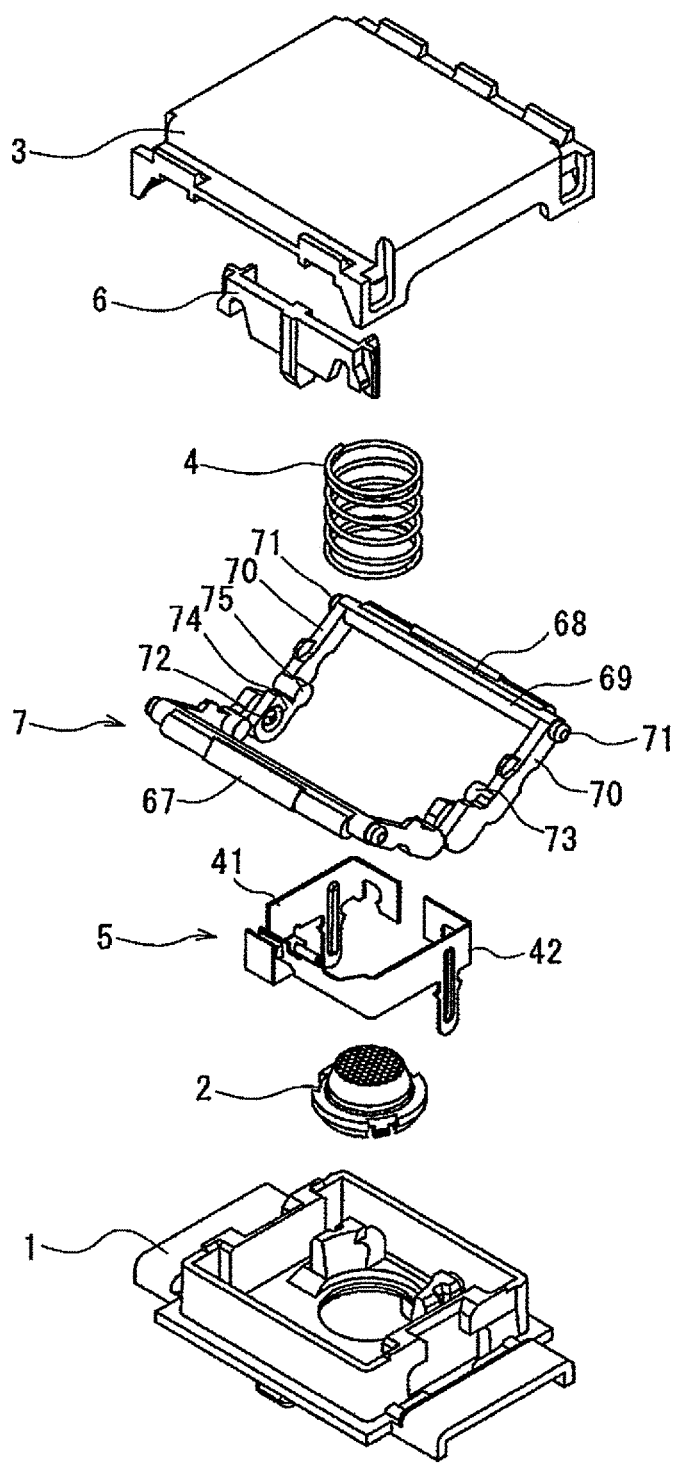
FIG. 5 is an exploded perspective view of the key switch device illustrated in FIG. 4.

FIG. 1 is a perspective view illustrating an entire key switch device 100 attached with a key cap 101 according to the embodiment, and is mounted on a printed board 103. FIG. 2 illustrates a state in which the key cap 101 has been removed from FIG. 1, and FIG. 3 is a perspective view illustrating a state in which the key switch device 100 has further been removed. FIG. 4 is a perspective view illustrating a state in which the key cap 101 and a button 3 have been removed from FIG. 1. FIG. 5 is an exploded perspective view of the key switch device 100 of FIG. 1. The key switch device 100 includes a base 1, a light guide 2, the button 3, a coil spring 4, a contact switch mechanism 5, a slider 6, and a lifting mechanism 7. A linear reinforcement member 102 is rotatably sandwiched between the button 3 and the key cap 101.

Figure 6A:
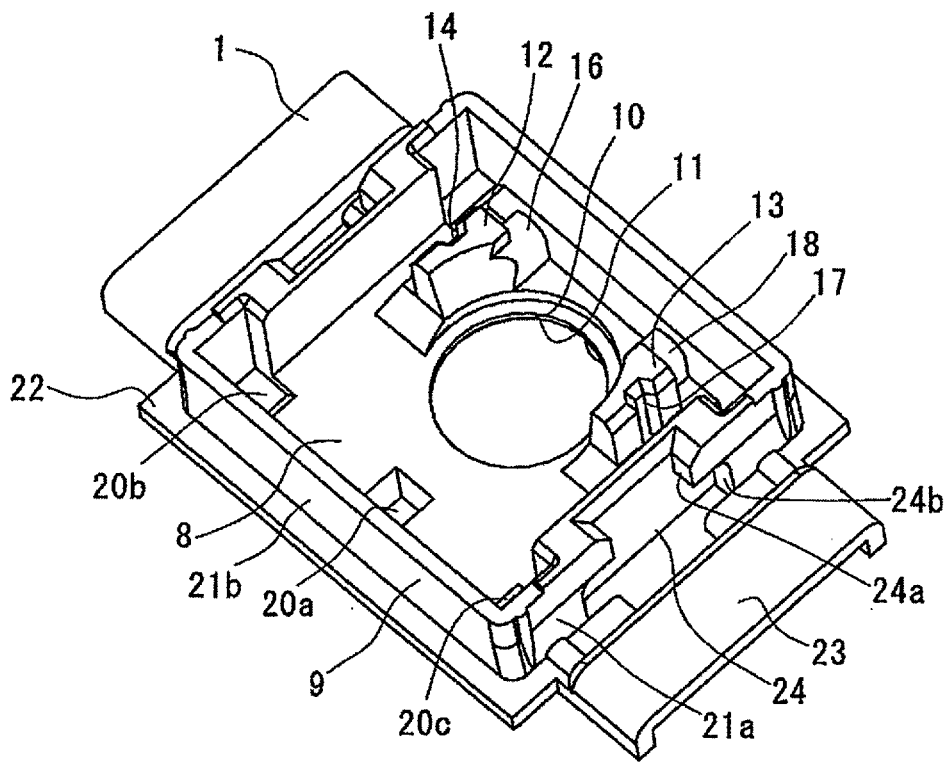
FIG. 6A is a perspective view of the base of FIG. 5.
Figure 6B:
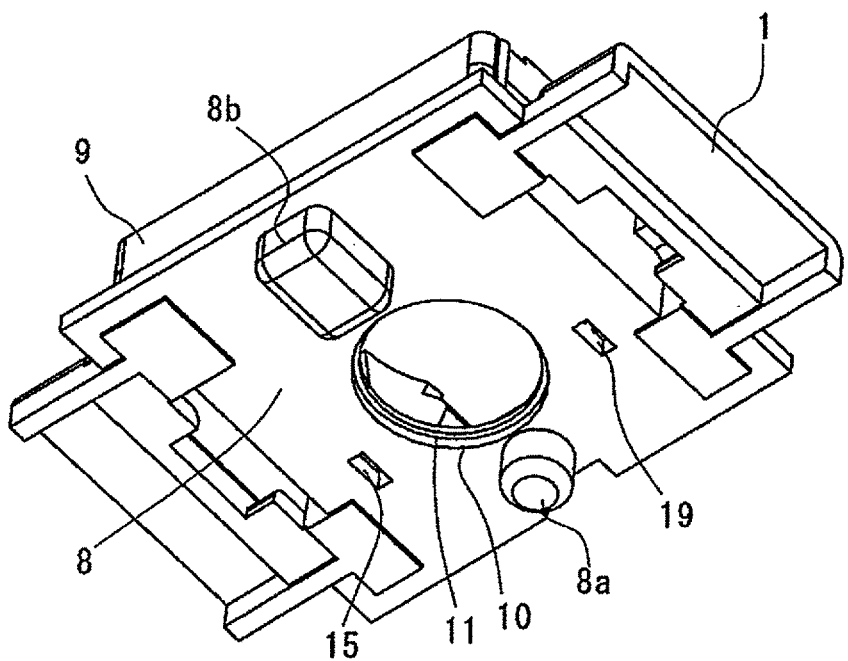
FIG. 6B is a perspective view of the base of FIG. 6A as viewed from below.

As illustrated in FIGS. 6A and 6B, the base 1 is formed by molding a synthetic resin material and includes a bottom 8 and a square frame 9.

An opening 10 having a circular shape in plan view is formed in the bottom 8. An annular latching receiving portion 11 is formed at a vertically central part of the inner circumferential surface of the opening 10. As will be described later, a latching claw 29a of the light guide 2 is latched into the latching receiving portion 11.

A first mount 12 and a second mount 13 are formed in the vicinity of the opening 10. The side surface of the first mount 12 is formed with a first latching groove 14 extending in the vertical direction. The bottom 8 is formed with a first terminal hole 15 that is continuous with the first latching groove 14 to communicate with the lower surface. Further, the first mount 12 is provided with a first latching elongated projection 16 with its upper surface formed of a projecting arcuate surface. The second mount 13 has a configuration similar to that of the first mount 12 and includes a second latching groove 17 and a second latching elongated projection 18. A second terminal hole 19 communicating with the second latching groove 17 is formed in the bottom 8. A fixed touch piece 41 is fixed to the first mount 12 and a movable touch piece 42 is fixed to the second mount 13.

A dent 20a having a rectangular shape in plan view is formed at a central portion of the upper surface of one side portion of the bottom 8. In addition, a dent 20b is formed at each of four corners of the bottom 8. When the button 3 is depressed, the lower end of an abutting portion 36, described later, of the button 3 comes into contact with the bottom surface of the dent 20b, to limit further movement of the button 3. The lower surface of the bottom 8 is formed with a first engagement portion 8a and a second engagement portion 8b with the opening 10 located therebetween. The first engagement portion 8a is circular in plan view and the second engagement portion 8b is rectangular in plan view. These are engaged respectively with a first aligning hole 103a and a second aligning hole 103b corresponding thereto at the time of mounting of the base 1 on the printed board 103, a light emitting diode (LED) 104 equipped on the printed board 103, described later, is accurately positioned in a recess 30 of the light guide 2 described later.

The square frame 9 is made up of two pairs of opposing side walls 21a, 21b, and a guard portion 22 is formed on the outside thereof. The guard portion 22 is used for supporting the lifting mechanism 7 described later. On the outside of each of the opposing side walls 21a, an extrusion preventing wall 23 is formed outside the guard portion 22. The extrusion prevention wall 23 prevents the first arm 67 and the second arm 68 from being pushed out laterally. A recessed part 24 is formed at a central portion of the outer surface of the opposing side wall 21a. In the recessed part 24, an upper half portion of the side wall 21a is formed of a narrow groove portion 24a, and a lower half portion of the side wall 21a is formed of an escape recess 24b which is wider than the groove portion 24a. The width dimension of the groove portion 24a is formed so as to allow insertion of the first arm 67 and the second arm 68, described later, in a folded state.

Figure 7A:
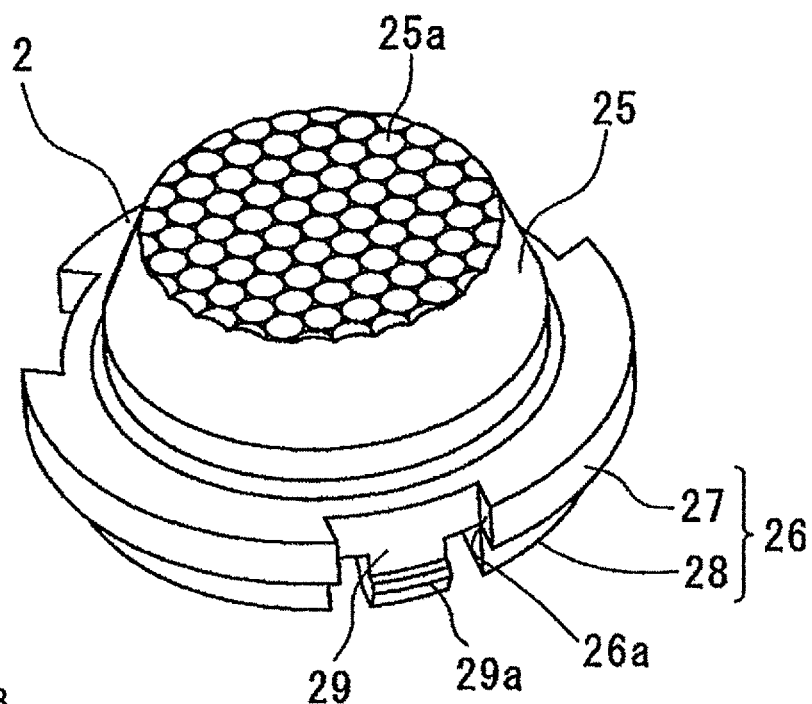
FIG. 7A is a perspective view of a light guide of FIG. 5 as viewed from above.
Figure 7B:
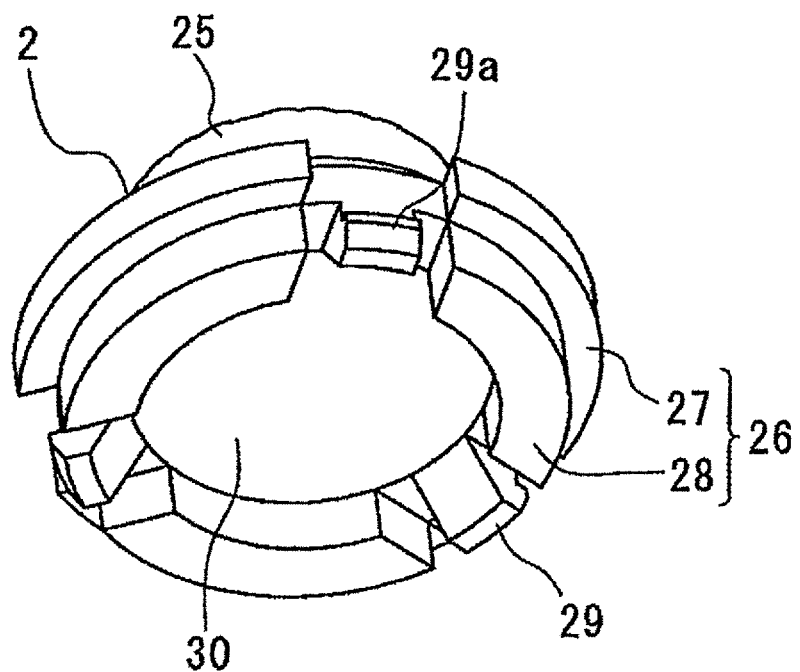
FIG. 7B is a perspective view of the light guide of FIG. 7A as viewed from below.

As illustrated in FIGS. 7A and 7B, the light guide 2 is formed by molding a light-transmitting synthetic resin material, and includes a truncated cone-shaped light guiding main body 25 and an elastic body receiving portion 26 protruding in the radial direction and from a lower end portion of the light guiding main body 25.

A plurality of convex lenses 25a is formed on the upper surface of the light guiding main body 25. The convex lens 25a diffuses light from the LED 104 as a light source.

The elastic body receiving portion 26 has a guard shape and is made up of a receiving portion main body 27 of the upper half portion and a cylindrical body 28 of the lower half portion. The elastic body receiving portion 26 has notches 26a formed at three circumferential locations with regular intervals, and claw portions 29 are formed in the respective notches 26a. The receiving portion main body 27 and the cylindrical body 28 are divided into three arcuate parts by the notches 26a. The receiving portion main body 27 has a larger outer diameter size than the opening 10 of the base 1, and its lower surface comes into contact with the upper surface of the bottom 8. The outer surface of the cylindrical body 28 comes into contact with the inner surface of the opening 10 and positions the light guide 2 in the radial direction with respect to the base 1. The space surrounded by the lower surface of the receiving portion main body 27 and the inner surface of the cylindrical body 28 is the recess 30 for disposing the LED, not illustrated. The claw portion 29 extends downward like the cylindrical body 28, and a latching claw 29a protruding to the outer diameter side is formed at the leading end part of the claw portion 29. The latching claw 29a is latched into the latching receiving portion 11 formed in the opening 10 of the base 1 to prevent the light guide 2 from falling upward off the opening 10.

Figure 8A:
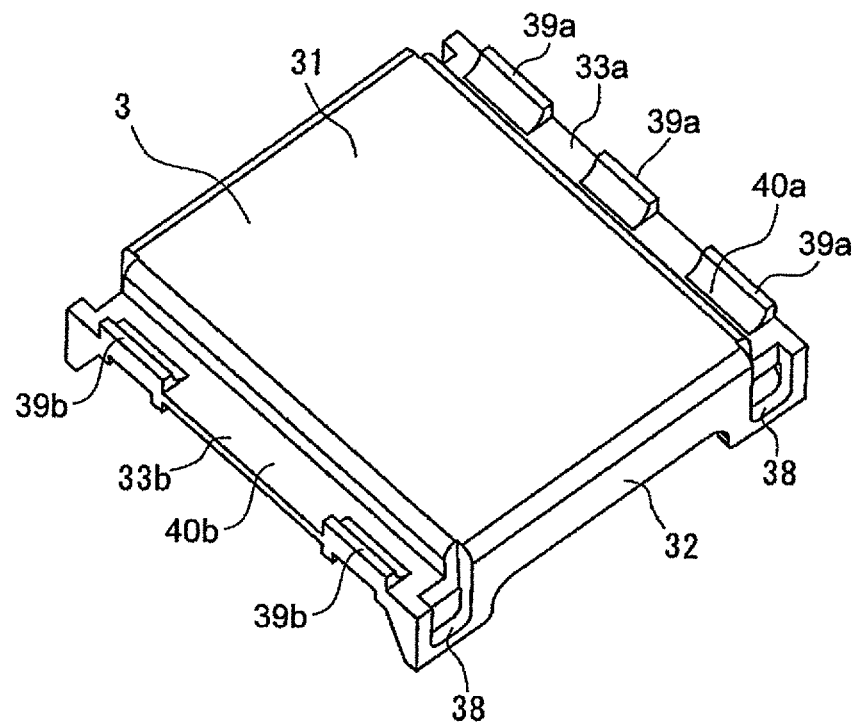
FIG. 8A is a perspective view of the button of FIG. 5 as viewed from above.
Figure 8B:
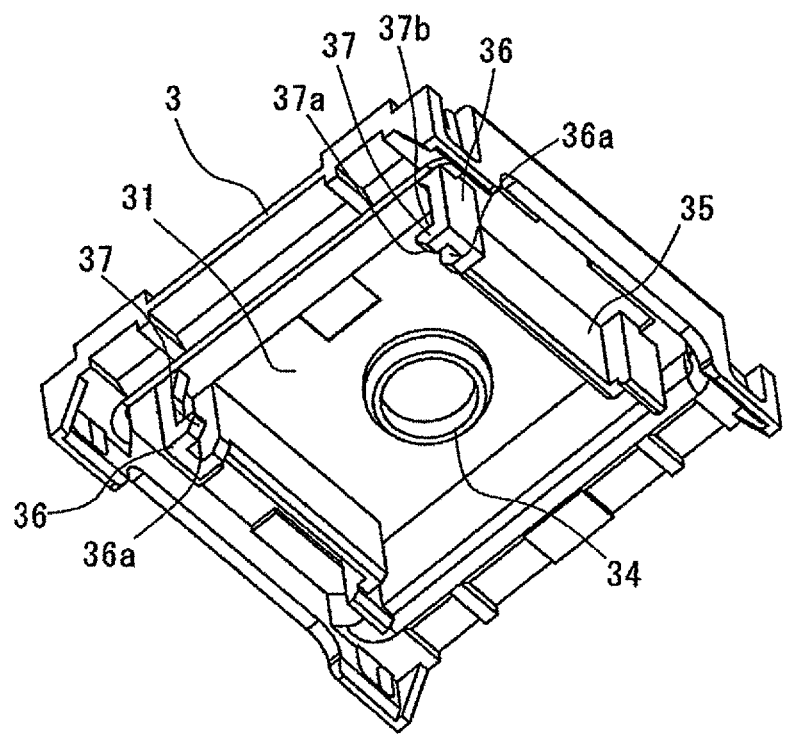
FIG. 8B is a perspective view of the button in FIG. 8A as viewed from below.

As illustrated in FIGS. 8A and 8B, the button 3 is formed by molding a synthetic resin material into a rectangular shape in plan view, and includes a flat plate portion 31, a side wall portion 32 extending downward from two opposing sides of the flat plate portion 31, and elongated portions 33a, 33b extending laterally from the remaining two opposing sides of the flat plate portion 31.

A cylindrical spring guide portion 34 is formed at a central portion of the lower surface of the flat plate portion 31. On the lower surface of the flat plate portion 31, a guide wall 35 is provided along the three sides. On the opposing wall on each side of the guide wall 35, an abutting portion 36 protruding beyond the other part is formed at each end part, and protrudes inward except for both end portions. Further, a guide groove 36a for guiding the slider 6 is formed in the opposing part of the abutting portions 36 located at each end portion of the guide wall 35. One side wall constituting the guide groove 36a is cut off except for the upper and lower end portions, and a raising protrusion 37 is formed at the lower end portion. The raising protrusion 37 includes an inclined surface 37a on the lower side gradually inclined upward and a flat surface 37b on the upper side.

Bearing holes 38 are formed at both end parts of the side wall portion 32 which extend further downward. A first shaft portion 71 of each of the first arm 67 and the second arm 68, described later, is rotatably and slidably supported in each bearing hole 38.

First projections 39*a* each having a recessed arcuate surface are formed at three locations with regular intervals on one extension 33*a*, namely, one edge portion of the top outer surface portion of the button 3. The side edge of the flat plate portion 31 and the arcuate surface of the first projection 39*a* constitute a recessed first support portion 40*a* that supports the linear reinforcement member 102. Second projections 39*b* each having recessed arcuate surfaces are formed at two locations on both sides on the other extension 33*b*, namely, the other edge portion of the top outer surface portion of the button 3. The side edge of the flat plate portion 31 and the arcuate surface of the second projection 39*b* constitute a second support portion 40*b*. The second support portion 40*b* is not used here, but the second support portion 40*b* can be used in place of the first support portion 40*a* for supporting the linear reinforcement member 102 depending on the difference in various conditions such as the shape of the key cap 101. On the lower surface of the extension 33*a*, latching recesses 39*c* are formed at positions corresponding to the first projections 39*a* and the second projections 39*b* on both sides, respectively. A latching claw 109*a* formed on a claw portion 109 of the key cap 101, described later, is latched into the latching recess 39*c*.

Returning to FIG. 5, the coil spring 4 as an example of the elastic body of the present invention is disposed between the elastic body receiving portion 26 of the light guide 2 and the spring guide portion 34 of the button 3, and the button 3 is urged upward to the base 1.

The contact switch mechanism 5 includes a fixed touch piece 41 and a movable touch piece 42, which are formed by pressing and bending a tabular copper alloy.

Figure 9A:
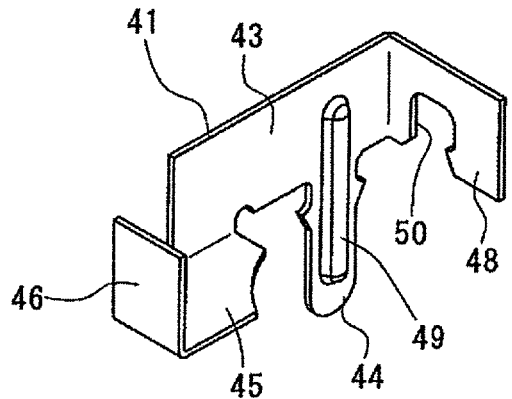
FIG. 9A is a perspective view of a fixed touch piece of FIG. 5.
Figure 9B:
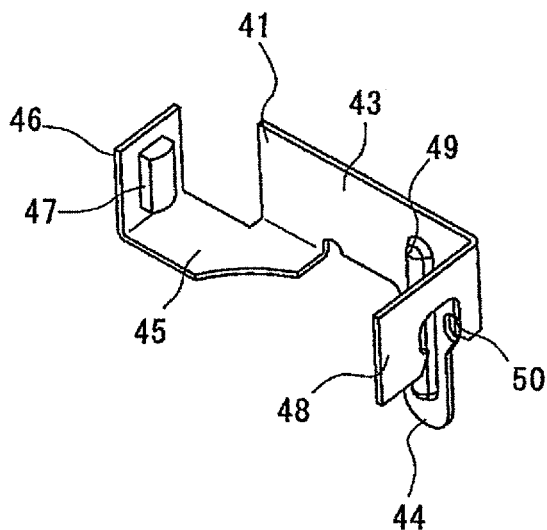
FIG. 9B is a perspective view of the fixed touch piece of FIG. 9A viewed from a different angle.

As illustrated in FIGS. 9A and 9B, the fixed touch piece 41 includes: a first planar portion 43; a fixed terminal portion 44 extending downward from a lower-edge central portion of the first planar portion 43; a second planar portion 45 extending orthogonally from the lower edge on one end side of the first planar portion 43; a third planar portion 46 extending orthogonally from one end edge of the second planar portion 45; a fixed contact 47 provided on the third planar portion 46; and a fourth planar portion 48 extending orthogonally from the other end edge of the first planar portion 43 and facing the third planar portion 46. A first latching protrusion 49 extending to the first planar portion 43 is formed at a central part of the fixed terminal portion 44. The first latching protrusion 49 is latched into the first latching groove 14 formed in the first mount 12 of the base 1. The fixed terminal portion 44 is pressed into the first terminal hole 15 and protrudes from the lower surface of the bottom 8. A first latching recess 50 cut out in an arcuate shape is formed at a lower-edge central portion of the fourth planar portion 48. The first latching elongated projection 16 of the first mount 12 is latched into the first latching recess 50.

Figure 10A:
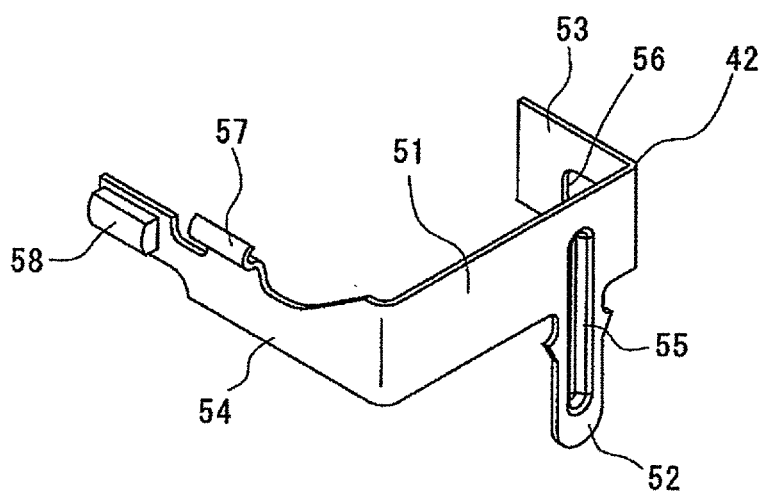
FIG. 10A is a perspective view of a movable touch piece of FIG. 5.
Figure 10B:
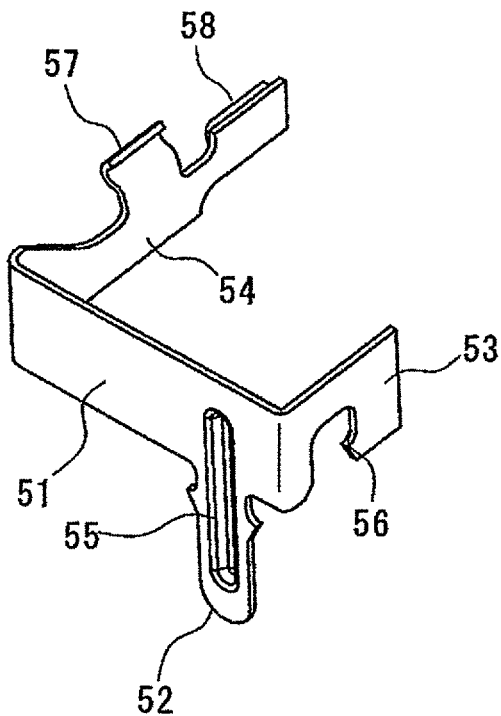
FIG. 10B is a perspective view of the movable touch piece of FIG. 10A as viewed from a different angle.

As illustrated in FIGS. 10A and 10B, the movable touch piece 42 includes: a first planar portion 51; a movable terminal portion 52 extending downward from the lower edge on one end side of the first planar portion 51; a second planar portion 53 extending orthogonally from one end of the first planar portion 51; and a third planar portion 54 extending orthogonally from the other end of the first planar portion 51 and partially facing the second planar portion 53. A second latching protrusion 55 extending to the first planar portion 51 is formed at a central part of the movable terminal portion 52. A second latching recess 56 cut out in an arcuate shape is formed at a lower-edge central portion of the second planar portion 53. The second latching elongated projection 18 of the first mount 12 is latched into the second latching recess 56. A protrusion piece 57, bent to have a substantially C shape in cross section, is formed at the upper-edge central portion of the third planar portion 54. The protrusion piece 57 is pressed by a pressing portion 59 of the slider 6, described later, to elastically deform the third planar portion 54 (furthermore, the first planar portion 51). A movable contact 58 is provided on the outer surface of the leading end of the third planar portion 54.

Figure 11A:
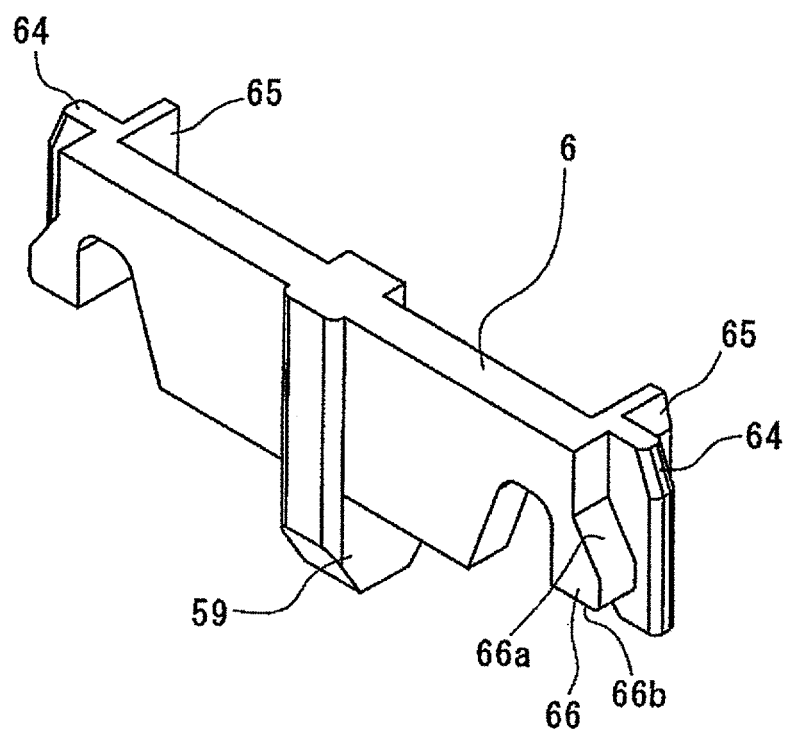
FIG. 11A is a perspective view of a slider of FIG. 5.
Figure 11B:
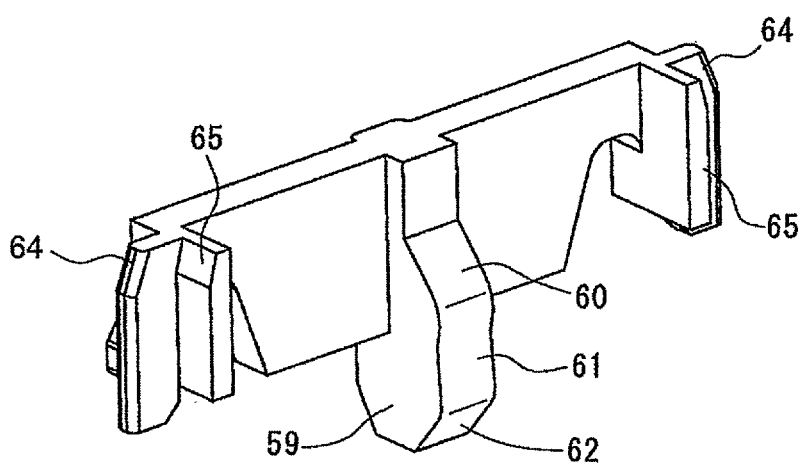
FIG. 11B is a perspective view of the slider of FIG. 11A as viewed from different angles.
Figure 12:
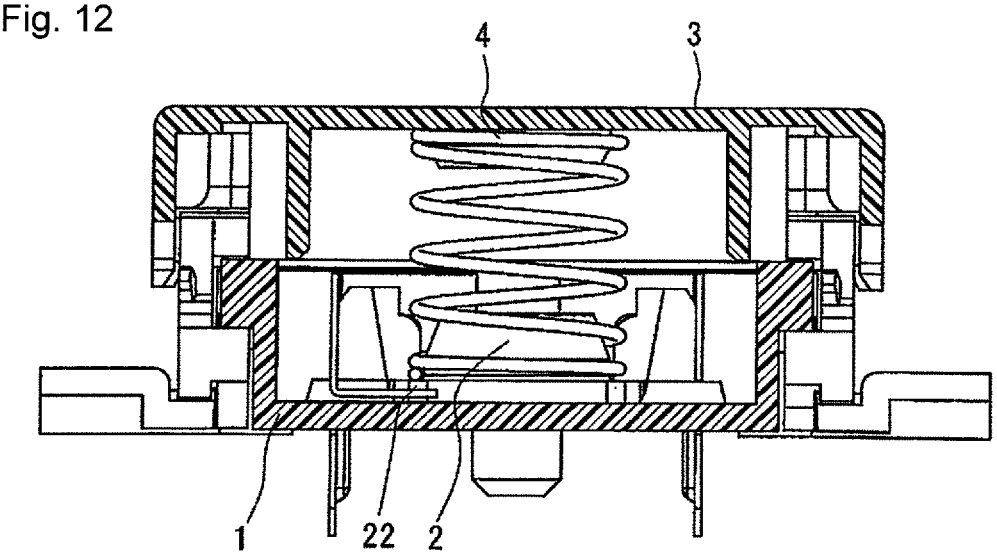
FIG. 12 is a front sectional view of the key switch device illustrated in FIG. 1.

As illustrated in FIGS. 11A and 11B, the slider 6 is a slider having a tabular shape and formed by molding a synthetic resin material. The slider 6 is provided with a pressing portion 59 at the central part. The pressing portion 59 includes a first inclined surface 60 that gradually protrudes from the side lower than the upper end by a predetermined dimension, and a recessed curved surface 61 that is continuous with the first inclined surface 60 and has a slight dent at the center of the protruding part. The pressing portion 59 includes, on the lower end side of the protruding part, a second inclined surface 62 with a gradually decreased protrusion dimension.

Further, the slider 6 is provided with a guided protrusion 64 at each end portion. The guided protrusion 64 is formed so as to divide a central portion of the outer surface of a flat portion 65 provided at each portion of the slider 6 into right and left. The guided protrusion 64 is inserted into the guide groove 36*a* formed in the button 3 and guided so as to be movable up and down. The flat portion 65 is formed with a raised protrusion 66 is formed on the lower side of one divided into two by the guided protrusion 64. The raised protrusion 66 has the upper surface formed of an inclined surface 66*a* gradually protruding downward and the lower surface formed of a flat surface 66*b*. The flat surface 37*b* of the raising protrusion 37 comes into contact with the flat surface 66*b* of the raised protrusion 66, and when the button 3 moves up, the flat surfaces are lifted together.

Returning to FIG. 5, the lifting mechanism 7 includes a first arm 67 and a second arm 68. The first arm 67 and the second arm 68 have the same shape and are each made up of a shaft body 69 and arms 70 extending from both end portions thereof. First shaft portions 71 are respectively formed at both end portions of the shaft body 69. A second shaft portion 72 and a first projection 73 protruding inward are formed on the leading end side of one arm 70. A bearing hole 74 through which the second shaft portion 72 is rotatably inserted and a second projection 75 protruding inward are formed on the leading end side of the other arm 70.

The first arm 67 and the second arm 68 are coupled to each other by inserting the second shaft portion 72 of the first arm 67 into the bearing hole 74 of the second arm 68 and inserting the second shaft portion 72 of the second arm 68 into the bearing hole 74 of the first arm 67. In the folded state, the coupling part of the first arm 67 and the second arm 68 is inserted through the groove portion 24*a* of the base 1 and expanded in the escape recess 24*b*, so that the first projection 73 and the second projection 75 come into contact with the upper surface constituting the escape recess 24*b* and is prevented from falling off the base 1. The coupled first arm 67 and second arm 68 are coupled to the button 3 by inserting the first shaft portion 71 into the bearing hole 38 of the button 3. The movement of the button 3 in the protruding direction is limited by the first shaft portion 71 coming into contact with the inner edge of the bearing hole 38. In addition, the movement of the button 3 in the pushing direction is limited by the lower end of the abutting portion 36 coming into contact with the bottom surface of the dent 20*b* of the base 1.

The key switch device 100 having the above configuration is mounted on the printed board 103. The printed board 103 is equipped with the LED 104. A first terminal hole 105*a* and a second terminal hole 105*b* are respectively formed on both left and right sides with the LED 104 placed therebetween. A first engagement hole 106*a* and a second engagement hole 106*b* are formed on the upper and lower sides of the LED 104, respectively. The fixed terminal portion 44 is inserted through the first terminal hole 105*a*. The movable terminal portion 52 is inserted through the second terminal hole 105*b*. The first engagement hole 106*a* has a circular shape in plan view, and the first engagement portion 8*a* of the base 1 is engaged therewith. The second engagement hole 106*b* has a rectangular shape in plan view, and the second engagement portion 8*b* of the base 1 is engaged therewith.

The key cap 101 is formed by molding a synthetic resin material and configured to have a long rectangular shape in plan view, extending from one end to the other end. That is, the key cap 101 is made up of a flat plate portion 107 having a rectangular shape in plan view, and a peripheral edge portion 108 extending from the four sides of the flat plate portion 107 in a direction perpendicular thereto and connected in a frame shape. A pair of claw portions 109 is formed at a central portion of each long side of the peripheral edge portion 108. A latching claw 109*a* extending in the opposing direction is formed at the leading end of each claw portion 109. These latching claws 109*a* are respectively latched into four latching recesses 39*c* formed in the button 3 of the key switch device 100.

The linear reinforcement member 102 is a substantially U-shaped wire obtained by bending a wire material at right angles so as to be parallel to each other at both end sides and is made up of an intermediate portion 102*a* and both side portions 102*b*.

Subsequently, a method of assembling the key switch device 100, the key cap 101, and the linear reinforcement member 102 having the above configuration will be described.

The key switch device 100 is mounted on the printed board 103 equipped with the LED 104. In mounting the key switch device 100, a first positioning protrusion 1*a* and a second positioning protrusion 1*b* formed on the lower surface of the base 1 are respectively engaged with a first aligning hole 103*a* and a second aligning hole 103*b* formed in the printed board 103. As a result, the LED 104 comes into the state of entering the recess 30 of the light guide 2.

Next, the linear reinforcement member 102 is mounted on the key switch device 100. The linear reinforcement member 102 is mounted only by disposing the intermediate portion 102*a* on the first support portion 40*a* formed on the button 3 and supporting the leading ends of both side portions 102*b* on support members, not illustrated. The first support portion 40*a* is formed in a recessed shape opening upward, thereby enabling easy placement of the intermediate portion 102*a* of the linear reinforcement member 102.

Finally, the key cap 101 is mounted on the key switch device 100 mounted on the printed board 103. The key cap 101 is mounted by respectively latching the latching claws 109*a* of the claw portion 109 into the latching recesses 39*c* formed in the button 3. With the key cap 101 in the mounted state, the lower surface of the key cap 101 is in contact with the upper surface of the button 3, and the intermediate portion 102*a* of the linear reinforcement member 102 disposed on the first support portion 40*a* is covered.

As thus described, the linear reinforcement member 102 can be mounted on the key switch device 100 in advance, thereby facilitating the work to mount the key cap 101. In addition, the periphery of the linear reinforcement member 102 is guided by the first support portion 40*a* of the button 3 and the lower surface of the key cap 101, so that it is possible to obtain a favorable mounting state.

Next, a description will be given of the operation of the key switch device mounted on the printed circuit board and equipped with the key cap.

Figure 13:
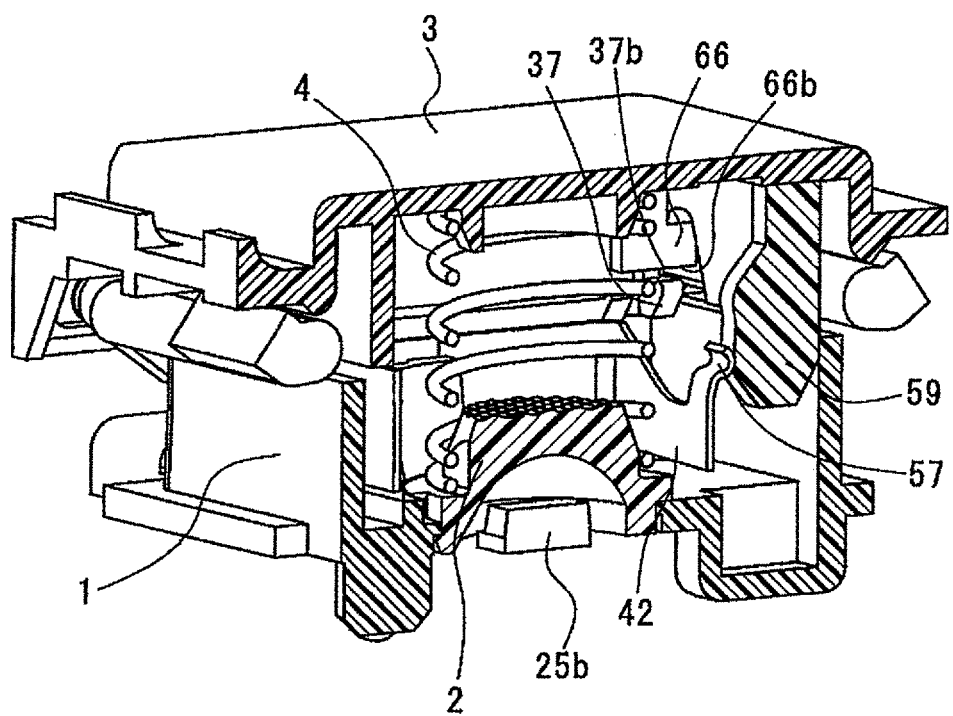
FIG. 13 is a perspective sectional view of the key switch device illustrated in FIG. 1.

In an initial state where the key cap is not pushed, the button 3 is urged upward by an urging force of the coil spring 4, and the respective first shaft portions 71 of the first arm 67 and the second arm 68 are in contact with the inner edges of the respective bearing holes 38 of the first arm 67 and the second arm 68. As a result, the button 3 is positioned at the protruding position. In this state, as illustrated in FIG. 13, the protrusion piece 57 of the movable touch piece 42 is pressed by the pressing portion 59 of the slider 6 and the movable contact 58 is separated from the fixed contact 47 of the fixed touch piece 41.

When the key cap is depressed, the button 3 moves downward against the urging force of the coil spring 4, and the slider 6 also moves downward together. At this time, the protrusion piece 57 of the movable touch piece 42 changes the press-contact position from the recessed curved surface 61 to the first inclined surface 60 of the slider 6. This leads to conversion of elastic energy stored in the third planar portion 46 of the movable touch piece 42 into a force to urge the slider 6 downward. As a result, the slider 6 independently moves downward with respect to the button 3, causing the flat surface 66*b* at the lower end of the raised protrusion 66 to collide with the flat surface 37*b* of the raising protrusion 37 of the button 3 and generate a sound. Not only the slider 6 simply falls due to its own weight but also the elastic force from the movable touch piece 42 can be applied, so that it is possible to increase the generated sound. Thus, when the keyboard provided with the key switch device having the above configuration is used, the user can clearly recognize that the pushing operation is performed appropriately. In addition, if the keyboard is used in a game or the like, it is possible to generate a sufficient sound by the pushing operation so as to be suitable for the use situation. In addition, the movable touch piece 42 having been elastically deformed restores its shape and extends straight, whereby the movable contact 58 is closed to the fixed contact 47.

When the pressing operation of the key cap is canceled, the button 3 is moved upward by the urging force of the coil spring 4. The first shaft portions 71 of the first arm 67 and the second arm 68 come into contact with the inner edges of the bearing holes 38 and the button 3 returns to the initial position. The flat surface 37*b* of the raising protrusion 37 formed on the button 3 comes into contact with the flat surface 66*b* of the raised protrusion 66 of the slider 6, which is then raised. The pressing portion 59 presses the protrusion piece 57 of the movable touch piece 42 to elastically deform the third planar portion 54 (furthermore, the first planar portion 51). As a result, the movable contact 58 is separated from the fixed contact 47 and returns to the initial state.

Note that the present invention is not limited to the configuration described in the above embodiment, and various modifications are possible.

In the above embodiment, the first support portion 40*a* for supporting the intermediate portion 102*a* of the linear reinforcement member 102 is provided at the edge portion of the top outer surface portion of the button 3, but the first support 40*a* may be provided at another position such as the central portion. The intermediate portion 102a of the linear reinforcement member 102 is supported not only at the two locations of the first support portion 40a and the second support portion 40b, but the support portions may be increased in number to be provided also at three or more locations. In other words, the support portions may be provided in plural locations, and a suitable support portion may be used as appropriate in accordance with usage conditions.

In the above-described embodiment, the coil spring 4 has been cited as an example of the elastic body, but the present invention is not limited thereto. For example, it is also possible to use a sponge, rubber or the like.

A variety of embodiments of the present invention have been described in detail with reference to the drawings, and lastly, a variety of aspects of the present invention will be described.

A key switch device of a first aspect of the present invention includes: a base; a button mounted on the base so as to be contactable and separable; an elastic body disposed between the base and the button and configured to urge the button in a direction away from the base; and a linear reinforcement member provided on the button and configured to prevent the button from being inclined when the button is operated in a direction toward the base. An outer surface portion of the button includes a recessed support portion in which a part of the linear reinforcement members is disposed to support the linear reinforcement member.

According to the key switch device of the first aspect, the linear reinforcement member can be mounted in advance on the support portion of the button. Further, the support portion being formed on the outer surface portion of the button, so that it is possible to facilitate the work to mount the linear reinforcement member in a visually observable state. Moreover, the support portion has a shape sufficiently recessed for disposing a part of the linear reinforcement member, so that it is possible to reliably obtain a desirable rotatable state and cause no defect due to deformation In a key switch device of a second aspect of the present invention, the button and the linear reinforcement member are covered with a key cap.

According to the key switch device of the second aspect, since the periphery of the linear reinforcement member is perfectly guided by the support portion and the key cap, the mounting state of the linear reinforcement member can further be stabilized. The key cap only needs to be put over the button, thus simplifying the work to mount the key cap.

In a key switch device of a third aspect of the present invention, the key cap has a rectangular shape in plan view, and a part along a longitudinal direction of the linear reinforcement member supported by the support portion of the button is disposed along a long side of the key cap.

According to the key switch device of the third aspect, the linear reinforcement member stably supports the key cap having a rectangular shape in plan view.

In a key switch device of a fourth aspect of the present invention, the support portion is provided at an edge portion of a top outer surface portion of the button.

According to the key switch device of the fourth aspect, it is possible to facilitate assembly only by placing a part of the linear reinforcement member on the top outer surface portion of the button.

In a key switch device of a fifth aspect of the present invention, the support portion is provided at each of a plurality of locations on the outer surface portion of the button.

According to the key switch device of the fifth aspect, it is possible to support the button in a desired state only by selecting one of a plurality of support portions and disposing a part of the linear reinforcement member.

By appropriately combining freely selected embodiments or modifications of the above variety of embodiments and modifications, it is possible to achieve the respective effects of those combined. It is possible to combine embodiments, combine examples, or combine an embodiment and an example, and it is also possible to combine features in different embodiments or examples.

While the present invention has been fully described in connection with the preferred embodiments with reference to the accompanying drawings, a variety of modified examples or corrections will be apparent to those skilled in the art. Such modifications or amendments are to be understood as being included in the scope of the present invention according to the appended claims so long as not deviating therefrom.

DESCRIPTION OF SYMBOLS 1 base
2 light guide
3 button
4 coil spring
5 contact switch mechanism
6 slider
7 lifting mechanism
8 bottom
9 square frame
10 opening
11 latching receiving portion
12 first mount
13 second mount
14 first latching groove
15 first terminal hole
16 first latching elongated projection
17 second latching groove
18 second latching elongated projection
19 second terminal hole
20a, 20b dent
21a, 21b side wall
22 guard portion
23 extrusion preventing wall
24 recessed part
25 light guiding main body
26 elastic body receiving portion
27 received portion main body
28 cylindrical body
29 claw portion
30 recess
31 flat plate portion
32 side wall portion
33a, 33b extension
34 spring guide portion
35 guide wall
36 guide groove
37 raising protrusion
38 bearing hole
39a, 39b, 39c first to third projections
40a first support portion
40b second support portion
41 fixed touch piece
42 movable touch piece
43 first planar portion
44 fixed terminal 45 second planar portion
46 third planar portion
47 fixed contact
48 fourth planar portion
49 first latching protrusion
50 first latching recess
51 first planar portion
52 movable terminal portion
53 second planar portion
54 third planar portion
55 second latching protrusion
56 second latching recess
57 protrusion piece
58 movable contact
59 pressing portion
60 first inclined surface
61 recessed curved surface
62 second inclined surface
64 guided protrusion
65 flat portion
66 raised protrusion
67 first arm
68 second arm
69 shaft body
70 arm
71 first shaft portion
72 second shaft portion
73 first projection
74 bearing hole
75 second projection
100 key switch device
101 key cap
102 linear reinforcement member
103 printed board
104 LED

The invention claimed is:

1. A key switch device, comprising:

a base;

a button mounted on the base that is contactable and separable;

an elastic body disposed between the base and the button that urges the button in a direction away from the base; and a linear reinforcement member provided on the button that prevents the button from being inclined when the button is operated in a direction toward the base, wherein the button includes a flat plate portion having a rectangular shape in plan view, a first elongated portion, and a second elongated portion, the first elongated portion and the second elongated portion extend from two opposing sides of the flat plate portion in opposing directions, an outer surface portion of the first elongated portion comprises a first recessed support portion configured to support the linear reinforcement member, an outer surface portion of the second elongated portion comprises a second recessed support portion configured to support the linear reinforcement member, each of the first and the second recessed support portions comprises a side edge of the flat plate portion and a plurality of projections, each projection including a recessed arcuate surface that supports the linear reinforcement member, wherein the recessed arcuate surface further comprises a groove portion, the first recessed support portion has a larger number of projections than the second recessed support portion, and a part of the linear reinforcement member is disposed in any of the first and the second recessed support portion.

2. The key switch device according to claim 1, wherein the button and the linear reinforcement member are covered with a key cap.

3. The key switch device according to claim 2, wherein the key cap has a rectangular shape in plan view, and a part along a longitudinal direction of the linear reinforcement member supported by the support portion of the button is disposed along a long side of the key cap.

4. The key switch device according to claim 1, wherein the support portion is provided at an edge portion of a top outer surface portion of the button.

5. The key switch device according to claim 2, wherein the support portion is provided at an edge portion of a top outer surface portion of the button.

6. The key switch device according to claim 3, wherein the support portion is provided at an edge portion of a top outer surface portion of the button.

7. The key switch device according to claim 1 further comprising a cylindrical spring guide portion formed at a central portion of a lower surface of the button.

8. The key switch device according to claim 1, wherein the first recessed support portions have three projections and the second recessed support portions have two projections.

* * * * *